United States Patent

[11] 3,579,146

[72] Inventors Thomas O. Paine
Administrator of the National Aeronautics and Space Administration with respect to an invention of;
Murray F. Cohen, Roslyn Heights, N.Y.

[21] Appl. No. 889,478
[22] Filed Dec. 31, 1969
[45] Patented May 18, 1971

[54] DIGITAL MODULATOR AND DEMODULATOR
10 Claims, 3 Drawing Figs.

[52] U.S. Cl. .......... 332/9R, 307/234, 307/265, 328/58, 324/106, 332/10
[51] Int. Cl. .......... H03k 7/08, H03k 9/08
[50] Field of Search .......... 332/9, 9 (T), 10; 329/104, 106, 126, 1; 328/58; 307/234, 265; 325/142

[56] References Cited
UNITED STATES PATENTS

| | | | |
|---|---|---|---|
| 3,314,062 | 4/1967 | Pommerning .......... | 307/265X |
| 3,350,637 | 10/1967 | Pochtar .......... | 332/9(T)(UX) |
| 3,426,296 | 2/1969 | Christiansen et al. .......... | 328/58X |
| 3,478,170 | 11/1969 | Hanni .......... | 325/142X |

*Primary Examiner*—Alfred L. Brody
*Attorneys*—Howard J. Osborn and William H. King

ABSTRACT: The modulation index of a pulse width modulated input signal is determined by employing the input signal, as synchronized with a reference signal, to control a gate which passes high frequency pulses to an up-down counter. The direction of counting of the counter is varied at twice the frequency of the input pulse repetition rate and the signal which controls counting direction is shifted in phase with respect to the reference signal whereby the output of the counter will be a positive or negative count having a magnitude commensurate with the degree of pulse width modulation of the input signal.

INVENTOR
MURRAY F. COHEN
BY
ATTORNEYS

DIGITAL MODULATOR AND DEMODULATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention is directed to apparatus for generating an output signal commensurate with information contained in an input signal. More specifically, the present invention relates to the digital processing of pulse width modulated wave trains. Accordingly, the general objects of the present invention are to provide novel and improved apparatus and methods of such character.

2. Description of the Prior Art

While not limited thereto in its utility, the present invention is particularly well suited for use in the demodulation of pulsating signals wherein the duty cycle of the signal is the information desired. Thus, for example, the present invention may be employed in a control system wherein an operational parameter or condition is monitored and a train of pulses having widths indicative of instantaneous position or condition is generated.

There have, in the prior art, been several schemes proposed whereby the modulation index of a pulse width modulated input signal could be detected for purposes of display or other use. These prior art demodulation schemes have, however, been characterized by a slow response to changes in the modulation index and have been relatively inaccurate in that they are insensitive to small changes in pulse width. As a general rule, the prior art circuits for generating a signal commensurate with the modulation index of a train of input signal pulses may be characterized as analog approaches in that they provide output signals having a magnitude or pulse width commensurate with modulation index. The inaccuracies inherent in such analog approaches are well known to those skilled in the art.

SUMMARY OF THE INVENTION

The present invention overcomes the foregoing and other disadvantages of the prior art by providing for the digital processing of information-bearing input signals. In accomplishing the foregoing, the present invention employs a chopper gate, controlled by the input signal or a signal commensurate therewith, to trigger an up-down counter. The up-down counter totalizes pulses from a high frequency clock, the clock pulses being passed by the chopper gate when energized. Before being applied to the chopper gate, the input signal is mixed with a scanning signal at a reference frequency. The scanning signal may be generated, via suitable frequency division circuitry, from the clock output.

Counter control signals at double the scanning signal frequency are also generated, typically through the use of frequency division circuitry, from the clock output and are shifted in phase with relation to the scanning signal whereby chopper gate control pulses commensurate with the input signal information control the application of clock pulses to the counter and the counter will alternately count, under command of its control signals, up and down with the counting in one direction being synchronized with the midpoint of the control pulses applied to the chopper gate. Accordingly, the output of the counter will be a positive or negative count having a magnitude commensurate with the degree of pulse width modulation or other information contained in the input signal.

BRIEF DESCRIPTION OF THE DRAWING

The present invention may be better understood and its numerous objects and advantages will become apparent to those skilled in the art by reference to the accompanying drawing wherein.

DESCRIPTION OF THE PREFERRED EMBODIMENT

Figures 1, 2, 3:
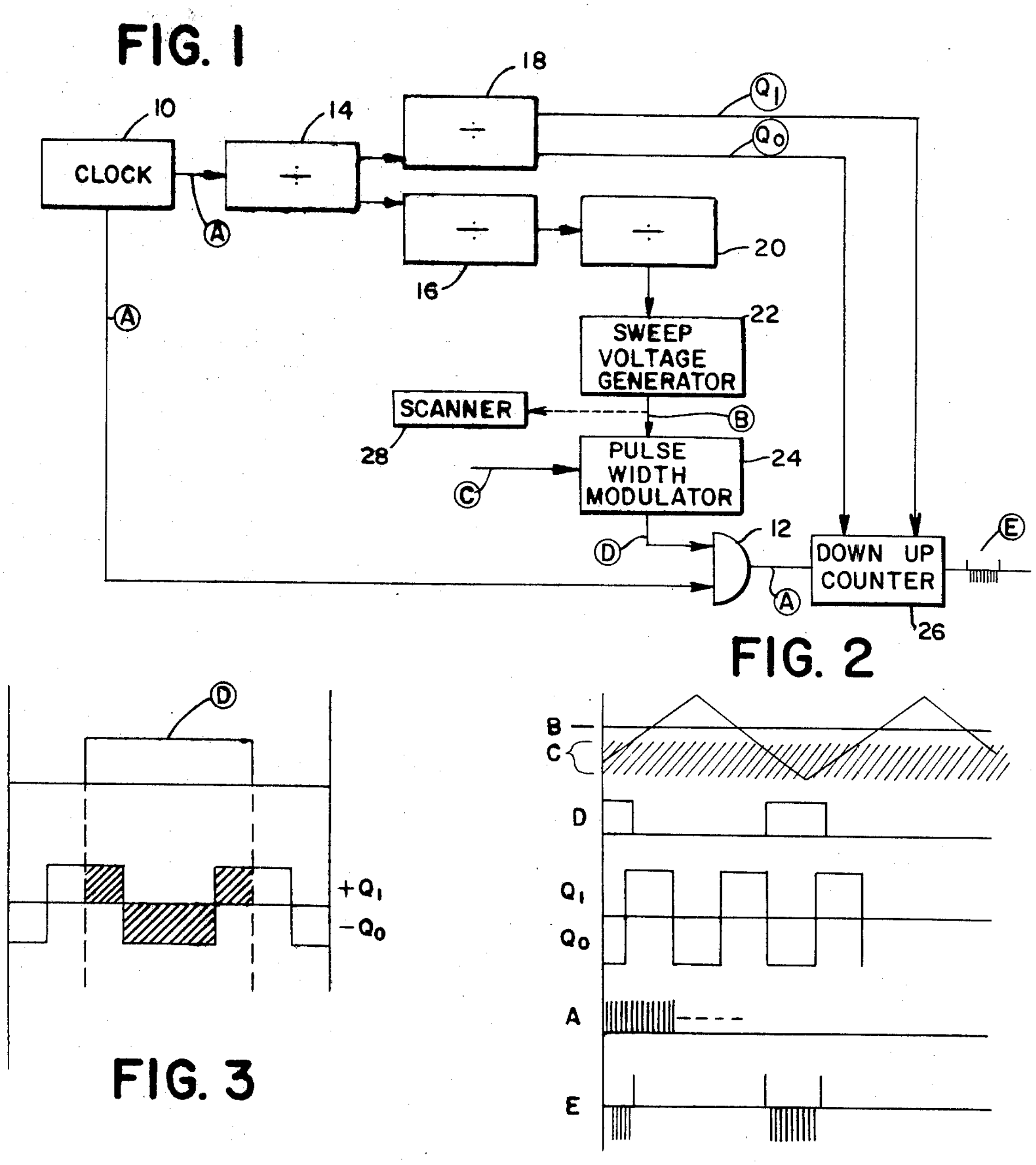
FIG. 1 is a block diagram of a preferred embodiment of the present invention.
FIG. 2 is a waveform diagram depicting operation of the embodiment of FIG. 1, the identification of the waveforms of FIG. 2 being applied to FIG. 1 at the points where the various signals appear in the circuitry.
FIG. 3 is a waveform diagram which theoretically represents the operation of the present invention.

While not limited thereto in its utility, the present invention has been found to be particularly well suited for use in the environment of an approach guidance planet tracker. Accordingly, the invention will be described below in connection with a system wherein the information-containing input signal comprises a pulse wave indicative of position; i.e., a pulse train wherein information provided by a suitable sensor is employed to modulate the width of the input signal pulses.

With reference now to FIG. 1, a high frequency clock circuit is indicated at 10. The clock 10 may, for example, comprise an astable multivibrator which provides a square wave output. The clock circuit output signals are indicated at A in FIG. 2 and the same indicia has been applied to FIG. 1.

The clock output pulses are applied to a first input of an AND gate 12 which in the manner to be described below, functions as a chopper gate. The clock output pulses are also applied to a first frequency division circuit 14. In a typical example, where the clock output frequency was at 102.4 $kH_z$, the division circuit 14 provided an output at 12.8 $kH_z$ or one-eighth of the clock frequency. The division circuits 14, 16 and 18 may, for example, comprise binary flip-flops or bistable multivibrators whereby a pair of output signals at the desired frequency but shifted 90° in phase are obtained.

The output signals from the division circuit 14 are applied as inputs to respective further division circuits 16 and 18. In a preferred embodiment, the division circuit 16 provides an output signal at one-half the frequency of the input applied thereto. In the example being described, therefore, the output of the division circuit 16 was a square wave signal at 6.4 $kH_z$.

One of the phase-related outputs of the division circuit 14 is applied as a toggling input to division circuit 18. The circuit 18 provides a pair of output signals which are 180° out-of-phase with one another and at one-half the frequency of the input signal to the division circuit 18. The output signals from the circuit 18, which are employed in the manner to be described below, are at the same frequency as the output from division circuit 16 and are related in phase thereto. As a typical example, the negative going pulses which comprise the $Q_o$ signal from circuit 18 lead the square wave signal from circuit 16 by 90° while the positive going pulses which comprise the $Q_1$ signal from circuit 18 lag the signal from circuit 16 by 90°.

The output of the division circuit 16 is applied to a further division circuit 20 which again divides by 2 to provide an output signal at one-half the frequency of the output signals from the division circuits 16 and 18. Thus, in the example being described, the output of circuit 20 would be at 3.2 $kH_z$. The circuit 20 may be identical to the circuit 16.

The output of the division circuit 20 is applied to a triangular wave form generator 22 which provides a linear sweep voltage B as may be seen from FIG. 3. The sweep voltage generator 22 may comprise a standard operational amplifier configured as an integrator.

The triangular scanning voltage generated by the sweep voltage generator 22 is applied as a first input to a pulse width modulator 24. The modulator 24 may, for example, comprise a pulsed switching circuit. Also applied to the pulse width modulator 24, as the modulating signal, is the information-bearing input signal from the condition sensing or scanning device 28. The modulating signal applied to the modulator 24 may comprise a pulse wave wherein the duty cycle is the sensed information or, as depicted in FIG. 3 at C, the input information may be in the form of a DC signal having a magnitude commensurate with the information. In either event, the input signal modulates the sweep voltage to provide the pulse width modulated pulses D as shown in FIG. 3. The pulses D are, accordingly, characterized by width commensurate with the information contained in the input signal; either in the form of magnitude or pulse width.

The pulse width modulated signals D from the modulator 24 are applied as gating signals to the AND gate 12 and thus control the transmission of clock pulses A to an up-down counter 26 via the gate 12. Restated, gate 12 is enabled by the pulse width modulated output signals from the modulator 24 and will pass clock pulses to the counter 26 only when a pulse D is applied at the input thereto. The up-down counter 26 may comprise a chain of binary flip-flops or a bistable multivibrator with appropriate gating.

The direction of counting of the counter 26 is controlled by the $Q_0$ and $Q_1$ signals from the frequency division circuit 18. The counting direction control signals, as may clearly be seen from FIG. 3, are related in phase and frequency to the sweep voltage B. In the embodiment being described this phase relationship results in the midpoint of the $Q_0$ or "down" command pulse being synchronized with the midpoint of the positive portions of the scanning voltage and thus with the midpoint of the modulated pulses D which contain the desired information. Accordingly, as may be seen from a simultaneous consideration of the various wave forms of FIG. 3, when clock pulses are passed via the gate 12 to the counter 26, the counter will first count up, will then count down and will again count up during the duration of the pulse D from the modulator 24.

Referring to wave form E of FIG. 3, it may be seen that the total of the clock pulses passed to the counter 26 during an example cycle of the sweep voltage provided by the waveform generator 22 will be a negative count and this count will be indicative of both direction and magnitude of a deviation of the sensed condition from a normal value. Restated, the totalized count at the end of each cycle of the output of the triangular wave form generator 22 is commensurate with modulation index and may be an indication of magnitude and direction of error.

The theory of operation of the present invention will be clearly understood from a consideration of FIG. 2 which illustrates the instant technique for the digital processing of the pulse width modulated wave train which appears at the output of the modulator 24. The pulses from the modulator 24, which control the chopper gate 12, are generated by a natural sampling process; this implies that the individual pulses are modulated symmetrically about the midduration point of the scanning voltage provided by the generator 22. In the usual instance this is insured by employing the scanning voltage from the generator 22 as a means for driving or controlling the scanning or sensing device 28. In FIG. 2, a square wave modulator output pulse D is shown at a frequency F with a counter control signal at 2F and displaced by 90°. It is to be noted that the area appearing in the positive portions of the counter control signal is equal to the area contained in the negative portions in the FIG. 2 example; the depicted condition typically being indicative of no error in the sensed condition.

I claim:

1. Apparatus for generating an output signal commensurate with information contained in an input signal comprising:
- means for generating a pulsating reference signal;
- means responsive to said reference signal and the information-bearing input signal for generating a pulse width modulated gating control signal characterized by pulses having widths commensurate with the information;
- gate means responsive to said gating signal and to said pulsating reference signal for selectively passing said reference signal;
- up-down counter means connected to the output of gate means;
- means responsive to said reference signal for generating counter control signals having a preselected phase and frequency relationship to said pulse width modulated signals whereby the direction of counting of reference signal pulses passed by said gate means may be varied during each cycle of said pulse width modulated signal; and
- means applying said counter control signals to said counter means whereby the totalized count will be commensurate with the information.

2. The apparatus of claim 1 wherein said counter control signals are in the form of pulses 90° out-of-phase with said pulse width modulated signals whereby the middle of each pulse of the pulse width modulated gating signal is synchronized with the middle of one of said counter control signals.

3. The apparatus of claim 2 wherein said pulse width modulated signal generating means comprises:
- scanning signal generator means responsive to said reference signal for providing a linear sweep voltage; and
- pulse width modulator means responsive to the output of said scanning signal generator and to said input signals.

4. The apparatus of claim 3 wherein said scanning signal generator comprises a triangular wave form generator.

5. The apparatus of claim 3 further comprising:
- frequency divider means connected between said reference signal generating means and said scanning signal generator whereby the pulse width modulated signal is at a first frequency lower than the frequency of said reference signal.

6. The apparatus of claim 5 wherein said scanning signal generator comprises a triangular waveform generator.

7. The apparatus of claim 6 wherein said counter control signal generating means comprises:
- second frequency divider means connected between said reference signal generating means and said means for applying counter control signals to said counter, said frequency divider means providing a pair of output signals at twice said first frequency.

8. A digital demodulator comprising:
- clock means for generating a pulsating reference signal;
- means connected to said clock means and responsive to said reference signal for generating control signals at a first frequency less than the frequency of said reference signal, first and second of said control signals respectively leading and lagging a third control signal by 90°;
- scanning voltage generating means connected to said control signal generating means and responsive to said third control signal for generating a linear sweep voltage synchronized with said third control signal, said sweep voltage being at a second frequency which is one-half said first frequency;
- modulator means connected to said scanning voltage generating means and responsive to said sweep voltage and information bearing input signals for providing a gating signal having pulses which vary in width with the information contained in said input signals;
- gate means connected to said clock means and to said modulator means, said gate means passing reference signal pulses when enabled by said gating signals; and
- bidirectional counter means responsive to reference signal pulses passed by said gate means, said counter means being connected to said control signal generating means and counting in the direction commanded by said first and second control signals.

9. The apparatus of claim 8 wherein said scanning voltage generating means comprises:
- first frequency divider means for providing a signal at one-half the frequency of said third control signal; and
- sweep voltage generator means responsive to the output provided by said first frequency generator means.

10. The apparatus of claim 9 wherein said control signal generating means comprises:
- second frequency divider means.